Dec. 19, 1967 SHIH-WOO LOU 3,359,523

SHUNT DEVICE

Filed Jan. 26, 1966 3 Sheets-Sheet 1

INVENTOR
SHIH-WOO LOU
By Emory L. Groff Jr. Atty

INVENTOR
SHIH-WOO LOU
BY Emory L. Groff Jr. Atty

Dec. 19, 1967 SHIH-WOO LOU 3,359,523

SHUNT DEVICE

Filed Jan. 26, 1966 3 Sheets-Sheet 3

INVENTOR
SHIH-WOO LOU
BY Emory L. Groff ATTY

United States Patent Office 3,359,523

Patented Dec. 19, 1967

3,359,523
SHUNT DEVICE

Shih-Woo Lou, 395 Queen's Road E., 4th Floor, Victoria, Hong Kong

Filed Jan. 26, 1966, Ser. No. 523,139
6 Claims. (Cl. 338—70)

ABSTRACT OF THE DISCLOSURE

A shunt device for series-connected electric lamps consisting of a shell housing for mounting on or in the base end of an Edison type socket, and having two metal contact discs in the shell with a cavity between them in which a conductive member such as a ball is located to provide contact between the facing plate surfaces at least one of which is coated with metal, for example aluminium oxide.

This invention concerns a shunt device for series-connected electric lamps and is of the kind in which the shunt includes an oxide-coated metal plate disposed between metal plates which have terminals for parallel connection with a lamp, the said coating breaking down should the filament of the lamp fail thus to maintain an electric circuit through the remaining series connected lamps.

It is an object of this invention to provide a shunt device which is mounted in an Edison type socket and which is of small proportions. A further object is to provide a device as aforesaid which can be manufactured economically and by mass production methods.

A still further object of the invention is to provide a construction of lamp socket and shunt in which the shunt can be secured to the socket to form a base closure, either at the base end below the socket wall, or within the socket wall.

Figures 1, 2A, 2B, 3A, 3B, 3C, 4, 5A, 5B, 5C:
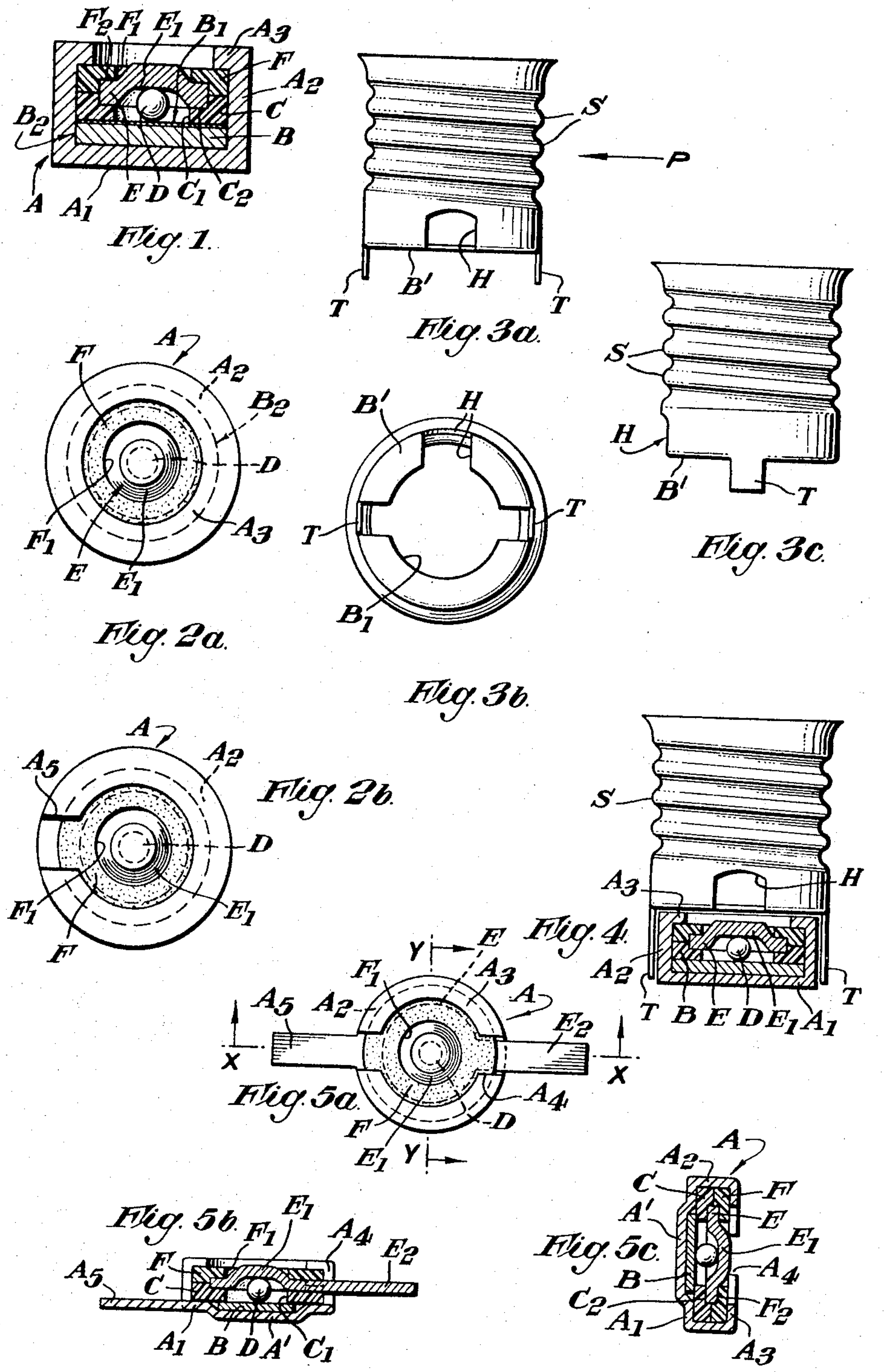

The invention will be described further, by way of example, with reference to the accompanying drawings, in which:

FIGURE 1 is a vertical diametrical section through a shunt device in accordance with the present invention;

FIGURE 2*a* is a plan view of the shunt device of FIGURE 1;

FIGURE 2*b* is a plan view of a slightly modified form of the shunt device of FIGURES 1 and 2*a;*

FIGURE 3*a* is an elevation of an Edison Socket modified to receive a shunt device of the present invention;

FIGURE 3*b* is an underneath plan view of the socket shown in FIGURE 3*a;*

FIGURE 3*c* is an elevation in the direction of the arrow P of FIGURE 3*a;*

FIGURE 4 is a part sectional view of a combined Edison Socket and shunt device, the latter being mounted externally of the lower end of the Edison Socket;

FIGURE 5*a* is a plan view of a further form of shunt device in accordance with the present invention;

FIGURE 5*b* is a section on the line X—X of FIGURE 5*a;*

FIGURE 5*c* is a section on the line Y—Y of FIGURE 5*a;*

Figure 6A:
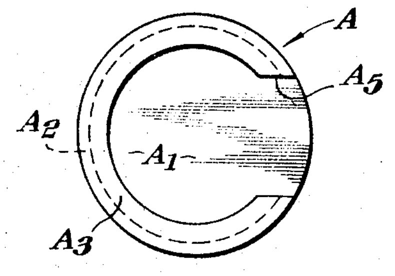
Figure 7A:
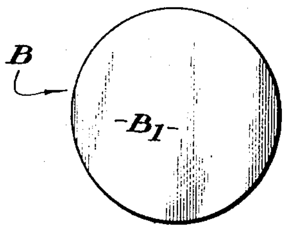
Figure 6B:
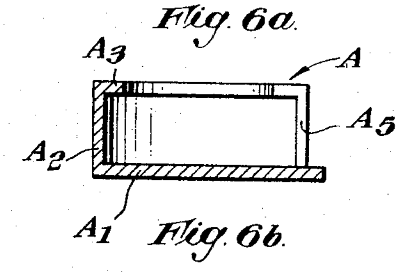
Figure 7B:
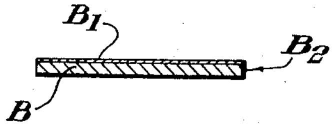

FIGURES 6*a* and 6*b* are plan and vertical sections of a shell of a modified and preferred form of shunt device of the present invention;

FIGURES 7*a* and 7*b* are similar views of an anodised disc for use in the shell of FIGURES 6*a* and 6*b;*

Figure 8A:
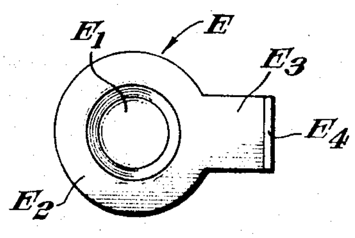
Figure 9A:
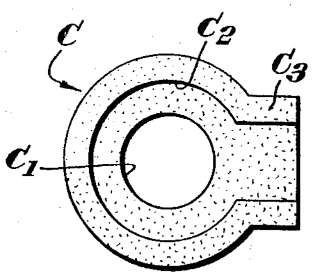
Figure 8B:
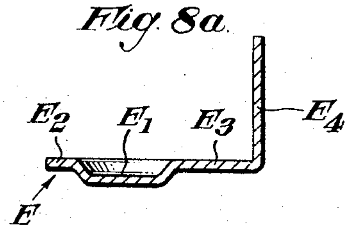
Figure 9B:
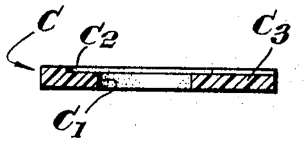
Figure 10:
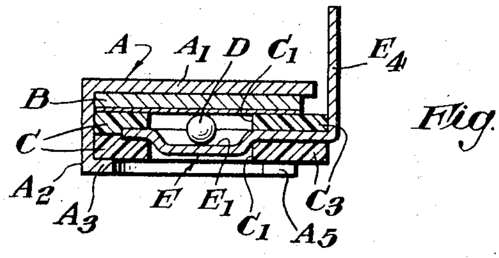
Figure 11A:
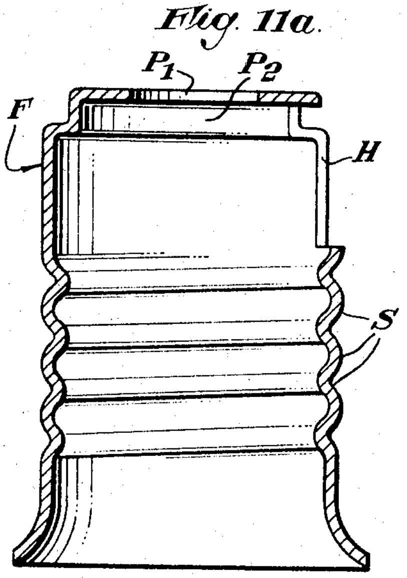
Figure 12A:
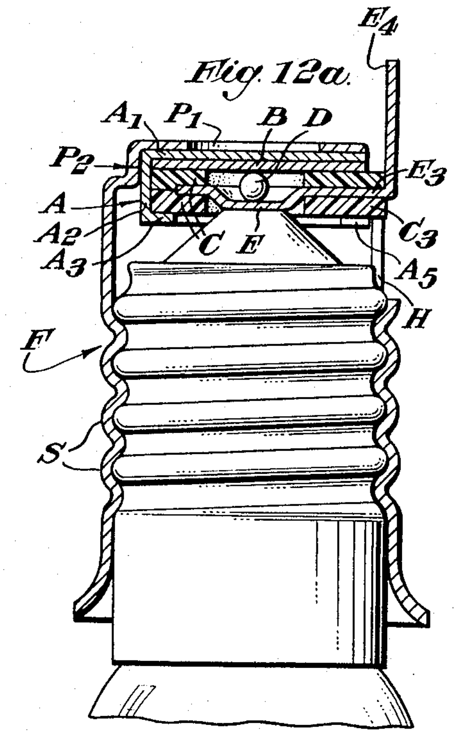
Figure 11B:
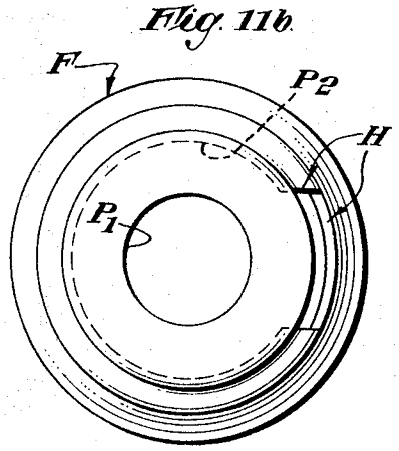
Figure 12B:
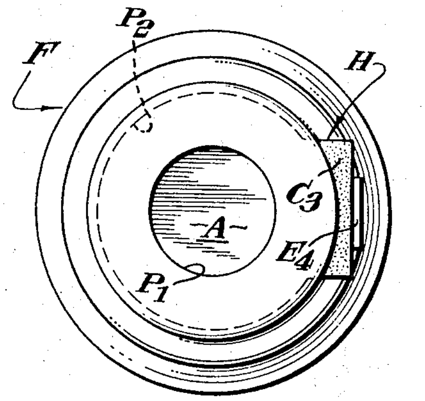

FIGURES 8*a* and 8*b* are similar views of an inverted terminal disc of the device of this embodiment;

FIGURES 9*a* and 9*b* are plan and vertical sections of an insulating ring of this embodiment of device;

FIGURE 10 is a vertical section through the assembled device of FIGURES 6 to 9;

FIGURES 11*a* and 11*b* are vertical sectional and plan views respectively of an Edison Socket for receiving the device of FIGURES 6 to 10, and FIGURES 12*a* and 12*b* are similar views of the socket with the device assembled thereto.

In the drawings, like reference numerals refer to similar parts.

A shunt device, constructed in accordance with the present invention and so shown in FIGURES 1 and 2*a,* comprises a cylindrical metal shell A having a flat bottom $A_1$, a cylindrical wall $A_2$, and a bent over top portion $A_3$. The centre portion of the bottom $A_1$ which is usually of lesser diameter than the portion $A_1$, may be downwardly convex if desired. The bottom $A_1$ constitutes a terminal and one lead of a pair of incoming leads is soldered thereto.

Within the shell A is a disc B of anodised aluminium, the upper surface at least being coated with the layer of aluminium oxide $B_1$. The disc B is a close tolerance fit within the shell A and directly contacts the bottom $A_1$ or the centre portion A′, the edges $B_2$ of the disc contacting the inner surface of the shell. This contact may be assured by roughening of the periphery of the disc, forming the same as a press fit within the shell or by increasing the thickness of the disc.

Two identical fibre rings C and F having overall diameters the same or slightly less than the internal diameter of the shell A, are provided. Axial apertures $C_1$ and $F_1$ are arranged to be greater than the diameter of a metal ball D to be contained within the device. The rings C and F have shoulder portions $C_2$ an $F_2$ respectively, of diameter equal to the diameter of a dished disc E of thickness equal to the sum of the shoulder portion heights of the rings C and F.

The ball D has a diameter such that when contained between the inverted disc E and the plate B, it contacts these members at substantially diametrically opposed points but yet is free to move easily.

The ball D is preferably of a soft metal and can be coated with silver or a like material to reduce contact resistance and to minimise sparking trouble. If desired, the ball D may have an anodic film thereon.

The disc E serves as a second terminal of the device and is arranged to receive the other lead of the pair of leads soldered thereto.

FIGURE 2*b* shows a slightly modified form of the device shown in FIGURES 1 and 2*a.* In this figure, the top portion $A_3$ of the shell A has a cut-away or slot $A_5$ which eliminates trouble caused by short circuiting between the shell A and the second lead to the disc E. The disc E may have a short radial tag which extends through the slot $A_5$ to facilitate further, the soldering of a lead thereto.

FIGURES 3*a, b* and *c* show an Edison Socket specially arranged to receive the shunt device mounted outside of the Edison Socket. The Socket comprises a sheet metal cylindrical body having a screw thread S in accordance with the International Electro-Technical Commissions Standards but with no centre terminal at its bottom, i.e. normally closed end. Two legs T are formed by punching the bottom B′ of the Socket. The bottom B′ of the socket has a circular hole $B_1'$ which serves as a passage for the centre base contact of an electric lamp to engage the convex portion $E_1$ of the disc E when the shunt device is mounted outside the socket, or to receive the concave portion A′ of the bottom $A_1$ of the shell A when the device is mounted within the socket (not shown). A hole H is provided in the lower side wall of the Socket to permit a lead to be connected to terminal disc E.

As shown in FIGURE 4, a shunt device is held between the legs T, and the shell A is soldered to these legs, the first lead of the pair of leads can be soldered to the bottom $A_1$ of the shell (as hereinbefore described) or can be soldered to the Socket wall. The second lead of the pair of incoming leads extends through the hole H and is secured to the portion $E_1$ of the disc E.

FIGURES 5*a*, *b* and *c* show a further form of shunt device of the present invention. The device comprises a shell A having a bottom $A_1$ with a central downwardly convex portion A′, a cylindrical wall $A_2$ and an upper bent over portion $A_3$. A slot $A_4$ is provided in the wall $A_2$ and a strip terminal $A_5$ extends from the shell diametrically opposite the slot $A_4$. An aluminium disc B coated on both surfaces with a layer of aluminium oxide is a press fit within the downwardly convex portion A′. The thickness of the disc B is equal to the depth of the portion A′. Rings C and F having central apertures $C_1$ and $F_1$ are of insulating material. The diameter of the apertures $C_1$ and $F_1$ should be greater than the diameter of a metal ball D to be enclosed in the device. The rings C and F have shoulder portions $C_2$ and $F_2$ of diameter and of combined height equal to the diameter and thickness, respectively of a disc E. The disc E has an upwardly convex portion $E_1$ and a radially extending strip contact $E_2$. The contact $E_2$ locates in the slot $A_4$ without contacting the wall $A_2$.

The ball D, which is conveniently of lead coated with silver, is of diameter such that it contacts the anodised disc C and the portion $E_1$ at diametrically opposed points, but may move easily within the device.

This shunt device may be employed within an ordinary electric lamp automatically to connect a second filament of the lamp in circuit on failure of a first filament or a part thereof, of the lamp.

In some respects, a shunt device as above described, is not entirely suitable; for example, if a lamp is screwed too hard into the socket it may force the soldering connections of the shunt device to the legs T of the socket.

FIGURES 6 to 12 represent a preferred embodiment of a device and socket therefor according to the present invention. As shown, the device comprises a cylindrical metal shell A having a substantially flat base $A_1$, a cylindrical wall $A_2$ and a turned over rim $A_3$. A slot $A_5$ is cut into the rim $A_3$ and the wall $A_2$ to receive radial extensions $C_3$ of fibre insulating rings C and $E_3$ of a tag E.

The base $A_1$ provides a terminal whereto one lead of a pair of incoming leads is soldered.

A disc B of anodised aluminium (FIGURES 7*a* and *b*) has at least its upper surface coated with a layer B, of aluminium oxide. The disc B is a close tolerance or press fit within the shell A and its surfaces may be roughened to ensure good contact with the interior surfaces of the wall $A_2$ and the base $A_1$.

The fibre rings C (FIGURES 9*a* and *b*) have an overall diameter equal to or slightly less than the internal diameter of the wall $A_2$ and each provides an axial aperture $C_1$ of diameter greater than that of a metal ball D to be contained in the device. Each ring C has a shoulder portion $C_2$ of diameter such as to receive a dished disc E therein. A radial extension $C_3$ extends from each ring C.

The ball D (FIGURES 10 and 12) is of diameter such as to contact the inverted disc E and the plate B when contained therebetween, but to be capable also of movement in the space therebetween. Thus, the ball D will contact, at diametrically opposed points, the surfaces of these two members. The ball D is preferably of a soft metal and may be coated with silver or a like spark reducing layer and/or may have an anodic film coated thereon.

The disc E (FIGURES 8*a* and *b*) has its radial extension $E_3$ bent in a direction opposite to that of a concave surface $E_1$ to give a portion $E_4$. The diameter of the concave surface $E_1$ of the disc E is slightly less than the diameter of the axial apertures $C_1$ of the rings C. The diameter of the rim $E_2$ of the disc is slightly less than the diameter of the shoulder portions $C_2$ of the rings C.

The width of the extension $E_3$ and the length thereof should be slightly less than and slightly greater than, respectively, the radial extensions $C_3$ of the rings C.

FIGURES 11 and 12 show an Edison Socket and the manner of assembly of the device therein. As shown, the socket F comprises a sheet metal cylindrical body having a standard screw thread S therein. The body is open at the top and closed at the bottom except for a central aperture $P_1$ therein. A recess $P_2$ of diameter equal to the diameter of the shell A is provided in the bottom. A lateral aperture H is formed in the wall of the socket. The aperture H receives the radial extensions $C_3$ of the rings C and $E_3$ of the disc E and the bent portion $E_4$.

The above described preferred embodiment facilitates assembly of the device and its securing in an Edison Socket. The subsequent soldering of terminals to the device, one through the aperture P, and one to the portion $E_4$ is also greatly facilitated.

The invention is not confined to the precise details of the foregoing example and variations may be made thereto. For instance, and as aforesaid, the disc B may have an oxide coating on one or both sides. The ball D may be omitted if a disc, such as the disc E shown in FIGURE 5 but inverted and having its convex portion E, directly contacting the anodised disc B, is used. The ball itself may have an anodic coating. An outwardly concaved slot may be provided in the side wall of the Edison Socket parallel to the axis of the socket and directly above the hole H. The shunt device may be secured below an Edison Socket, as described in the first embodiment, or may be secured within the socket as described in the second embodiment.

I claim:

1. A shunt device for series-connected electric lamps mounted at the normally closed end of an Edison type socket, said device comprising a cylindrical metal shell constituting a terminal and electrically connected to the conducting wall of the socket and having a closure base wall, a first metal disc within and in electrical contact with said shell on said base, a second metal disc within said shell, insulating members in said shell insulating the second said disc from the first disc and from the shell, a cavity between the first and second discs within the shell, an oxide metal coating on the surface of one disc within said cavity, and an electrically conducting movable member in said cavity to provide contact between the surface coating and the surface of the uncoated disc, the said second disc constituting a second terminal, the top of the shell being open so that the upper surface of said second disc provides a contact for the centre base contact of an electric lamp when engaged in the socket.

2. A shunt device as claimed in claim 1, wherein the second disc is of inverted dished form to provide the said cavity.

3. A shunt device as claimed in claim 2, wherein the socket has a recess at its closed end to receive the device, the said second disc having a lateral bent-up extension for the soldering of an electrical lead, said extension projecting through a lateral aperture in the socket.

4. A shunt device as claimed in claim 3, wherein the socket has punched-out leg portions to which the shunt device is soldered.

5. A shunt device as claimed in claim 1, wherein the movable member comprises a ball.

6. A shunt device as claimed in claim 5, wherein the ball is of a soft material and is surface coated with silver.

References Cited

UNITED STATES PATENTS

| | | | |
|---|---|---|---|
| 1,807,588 | 6/1931 | Eckstein | 338—219 |
| 1,954,355 | 4/1934 | Handy | 338—219 |
| 1,970,519 | 8/1934 | Dorgelo et al. | 338—219 |
| 2,180,976 | 11/1939 | Butler | 200—118 |
| 2,483,247 | 9/1949 | Stoffel | 338—219 |
| 2,675,452 | 4/1954 | McMahan | 338—219 |
| 3,070,767 | 12/1962 | Rabinow | 338—70 |
| 3,142,031 | 7/1964 | Rosenblatt | 338—219 |

RICHARD M. WOOD, *Primary Examiner.*

W. D. BROOKS, *Assistant Examiner.*